Oct. 18, 1932.  E. THOMPSON  1,883,109
MOTOR AND PUMP ASSEMBLY FOR ICE CREAM FREEZERS
Filed June 3, 1931
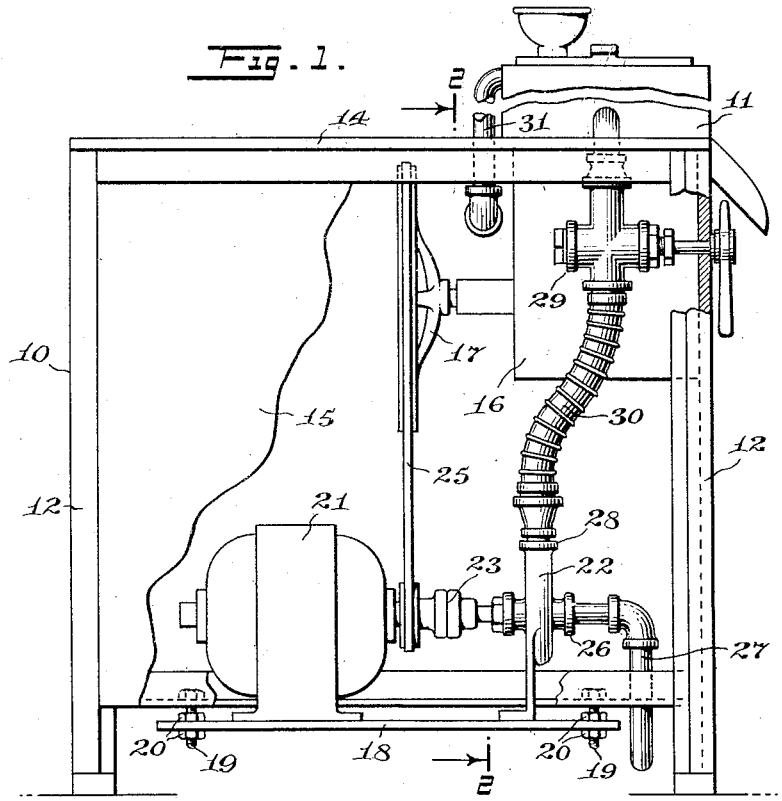
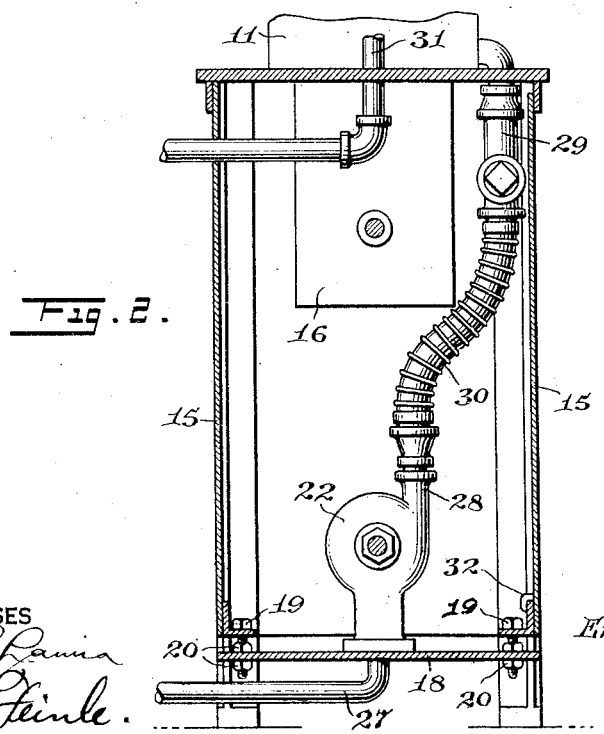
WITNESSES
INVENTOR
Emery Thompson
BY
ATTORNEYS Patented Oct. 18, 1932

1,883,109

UNITED STATES PATENT OFFICE

EMERY THOMPSON, OF NEW ROCHELLE, NEW YORK

MOTOR AND PUMP ASSEMBLY FOR ICE CREAM FREEZERS

Application filed June 3, 1931. Serial No. 541,935.

This invention relates to a motor and pump assembly for an ice cream freezer, and essentially involves a structure for supporting the assembly, and said structure in accordance with the invention being advantageously in the form of a stand for the ice cream freezer which may be of the vertical type.

It has been found necessary in connection with a vertical freezer mounted on a closed-in stand, to have the driven element, such as the chain sprocket or belt pulley on the back of the gear box, because its centers will not permit it to be put on the side of the gear box, and, furthermore, if the sprocket or pulley were so arranged, it would interfere with the operator, and be a source of danger because it would not be enclosed, and also it would increase the size of the freezer as regards over all dimensions thereby taking up unnecessary space.

In accordance with the invention there is provided an improved assembly of motor, and refrigerant or brine pump in relation to the other parts of the freezer including the refrigerant control valve, and the driven element or pulley of the power and motion transmission. The improvement resides in the fact that adjustments may be quickly and easily made of the pulley belt without interfering or requiring adjustment of the refrigerant or brine connection between the pump and the control valve of the freezer. Adjustment of the refrigerant or brine connection aforesaid is avoided due to the fact that it is flexible, the same being in the form of a rubber hose or the like. This form of connection acts as an insulation for the cold refrigerant solution and does not have a tendency to frost, sweat or be otherwise affected by changes in temperature of the surrounding air.

The herein improvement also makes it possible to enclose the motor and pump assembly within a stand, and also provides for cleanliness, and ventilation underneath the freezer, and also air circulation for the motor.

The nature of the invention and its distinguishing features and advantages will appear when the following specification is read in connection with the accompanying drawing, in which Figure 1 is a side view of an ice cream freezer and its stand together with the motor and pump assembly, portions being shown in section and other portions being broken away;

Figure 2 is a section on the line 2—2 of Figure 1.

The assembly of the present invention essentially involves a supporting structure or stand 10 on which is mounted a vertical ice cream freezer 11. The stand 10 is constructed of uprights 12 in the form of angle irons and horizontal members 13 each in the form of an angle iron, and each of these members 13 connects a pair of the uprights 12 together near the lower ends thereof. A top 14 is secured to the upper ends of the uprights 12. End and side panels 15 are applied to the uprights 12 and horizontal members 13 to form a closed-in form of stand. The freezer 11 is of standard type and is supported mainly on the top 14 of the stand 10. The freezer 11 includes motion transmission means including gears each housed within a box 16 on the lower end of the freezer and arranged within the stand 10 at the top and at one end thereof. The motion transmission means includes a driven element in the form of a belt pulley 17 arranged exteriorly of the box 16 at the rear thereof within the stand 10.

In accordance with the invention use is made of a base member or rectangular plate 18 which is arranged below the horizontal members 13. Bolts 19 project downwardly through the horizontal members 13 and are received in holes respectively in the base member or plate 18, and nuts 20 are arranged on each of the bolts 19 respectively above and below the base member or plate 18. These nuts 20 may be adjusted on the bolts 19 and may be brought into clamping engagement with the base member or plate 18. The provision and arrangement is such that the base member or plate 18 may be raised or lowered within certain limits to various positions of adjustment. An electric motor 21 is mounted on the base member 18, and a pump 22 is also mounted on the base member 18. The shaft of the motor 21 is coupled with the shaft of the pump 22 as at 23. The motor shaft has a small pulley 24, and a belt 25 encircles the pulley 24 and the pulley 17. In this manner the mixer or paddle within the ice cream freezer is driven or rotated to agitate or mix the contents of the freezer. The inlet 26 of the pump is connected with the refrigerant or brine tank by suitable connections 27 which extend forwardly from the pump, then downwardly and then laterally. It is to be observed that the base member 18 is shorter in length than the longitudinal distance between the uprights 12. This enables the connection 27 to be brought downwardly below the base member 18. The outlet 28 of the pump is connected with a control valve 29 by a flexible conduit preferably in the form of a rubber hose 30. The valve 29 is intended for controlling the flow of refrigerant solution or brine from the chamber 21 to the bottom of the freezing chamber of the freezer 11. The upper end of the freezing chamber of the freezer 11 is connected with the refrigerant solution or brine tank by a suitable return connection 31.

From the foregoing it will be apparent that should it be necessary to take up slack in the belt 25 by reason of the belt stretching, or to give a certain amount of slack to the belt by reason of the belt contracting, the base member may be lowered or raised, as the case may be, by adjusting the nuts 20. This may be accomplished without disconnecting or reconnecting the conduit 30 because it is flexible. It will therefore be understood that any unskilled person may make the necessary adjustments to keep the freezer and its operating parts in proper working condition. It is to be understood that the flexible connection or conduit 30 may be connected directly with the lower end of the freezing chamber of the freezer, if desired, instead of to a valve, such as the valve 29, which may be omitted.

It will be apparent that the base member or plate 18 is of such size and bears such relation to the lower edges of the panels 15 as to give ventilation underneath the freezer, and also allows air circulation to the motor 21. By using a rubber hose between the pump 21 and a part of the freezer 11, it will act as an insulator for the cold refrigerant solution, and does not have a tendency to frost or sweat, which eliminates moisture within the stand.

In order to make the motor and pump conveniently accessible, one of the side panels 15 is removably held in place by the simple expedient of hooks 32 on the inside of the panel near the lower edge thereof to engage over the upstanding flange of the related angle iron 13. The particular panel is of such size that it may be raised to disengage the hooks, whereupon the panel may be removed to afford access to the motor or pump or any other part within the stand.

I claim:

1. The combination with an ice cream freezer and stand therefor, of a base member adjustably mounted within the stand at the bottom thereof to change the elevation of said member, means to adjust said base member and to rigidly maintain it in its adjusted position, a motor and a pump operatively connected with said motor mounted on said base member, and a flexible refrigerant conduit connected with said pump and freezer.

2. The combination with an ice cream freezer and stand therefor, of a base member adjustably mounted within the stand at the bottom thereof to change the elevation of said member, a motor and a pump operatively connected with said motor mounted on said base member, a flexible refrigerant conduit connected with said pump and freezer, and driving means including a belt connecting the shaft of said motor with a driven part of said freezer.

3. The combination with an ice cream freezer and stand therefor, of a base member adjustably mounted within the stand at the bottom thereof to change the elevation of said member, means to adjust said base member and to rigidly maintain it in its adjusted position, a motor and a pump operatively connected with said motor mounted on said base member, and a flexible non-metallic refrigerant conduit connected with said pump and freezer.

4. An ice cream freezer stand, and in combination, a base plate arranged at the bottom of the stand above the lower extremities thereof, and means adjustably connecting the base plate with the stand to vary the elevation of the base plate, said means consisting of bolts carried by said stand, and a nut or nuts adjustable on each of said bolts and engageable with said base plate.

5. An ice cream freezer stand having a top and side and end panels to form a housing open at the bottom, said panels terminating above the lowermost extremities of the stand, and in combination, a base plate arranged at the bottom of the stand, and means adjustably connecting the base plate with the stand to vary the elevation of the base plate, said means consisting of bolts carried by said stand, and a nut or nuts adjustable on each of said bolts and engageable with said base plate.

6. An ice cream freezer stand having a top and side and end panels to form a housing open at the bottom, said panels terminating above the lowermost extremities of the stand, and in combination, an assembly consisting of a base, a motor and pump on the base, the motor being operatively connected with the pump so that the latter will be driven by the former, and means to raise and lower the assembly in relation to the stand to vary the elevation of the assembly, and said means serving to rigidly maintain the assembly in place.

EMERY THOMPSON.